US010865833B2

United States Patent
Kojima et al.

(10) Patent No.: US 10,865,833 B2
(45) Date of Patent: Dec. 15, 2020

(54) BEARING STRUCTURE AND TURBOCHARGER

(71) Applicant: IHI Corporation, Koto-ku (JP)

(72) Inventors: Hideyuki Kojima, Tokyo (JP); Shunsuke Nishii, Tokyo (JP)

(73) Assignee: IHI Corporation, Koto-ku (JP)

(*) Notice: Subject to any disclaimer, the term of this patent is extended or adjusted under 35 U.S.C. 154(b) by 0 days.

(21) Appl. No.: 16/381,421

(22) Filed: Apr. 11, 2019

(65) Prior Publication Data
US 2019/0234238 A1    Aug. 1, 2019

Related U.S. Application Data

(63) Continuation of application No. PCT/JP2017/040986, filed on Nov. 14, 2017.

(30) Foreign Application Priority Data

Nov. 21, 2016   (JP) ................... 2016-226071

(51) Int. Cl.
*F16C 33/74* (2006.01)
*F01D 25/16* (2006.01)
*F16C 17/04* (2006.01)
*F16C 33/10* (2006.01)
*F01D 25/18* (2006.01)

(52) U.S. Cl.
CPC ............. *F16C 33/74* (2013.01); *F01D 25/16* (2013.01); *F16C 17/04* (2013.01); *F16C 33/106* (2013.01);
(Continued)

(58) Field of Classification Search
CPC .......... F16C 17/02; F16C 17/04; F16C 17/10; F16C 33/106; F16C 33/1085; F16C 33/74;
(Continued)

(56) References Cited

U.S. PATENT DOCUMENTS 3,494,679 A * 2/1970 Burdette ................. F16C 33/72
                                                        384/139
4,358,253 A * 11/1982 Okano ................... F01D 25/166
                                                      384/368
(Continued)

FOREIGN PATENT DOCUMENTS

| CN | 104420899 A | 3/2015 |
| CN | 105980686 A | 9/2016 |

(Continued)

OTHER PUBLICATIONS

Office Action dated Jan. 28,2020 in Japanese Patent Application No. 2018-551650 (with unedited computer generated English translation), 4 pages.

(Continued)

*Primary Examiner* — James Pilkington
(74) *Attorney, Agent, or Firm* — Oblon, McClelland, Maier & Neustadt, L.L.P.

(57) ABSTRACT

Provided is a bearing structure including: a shaft; a first opposed surface, which is formed on the shaft or a member mounted to the shaft; a first bearing portion, which is opposed to the first opposed surface from one end side of the shaft; a second opposed surface, which is formed on the shaft or the member mounted to the shaft, and is positioned on the one end side of the shaft with respect to the first opposed surface and the first bearing portion; and a second bearing portion, which is opposed to the second opposed surface from the one end side of the shaft.

9 Claims, 6 Drawing Sheets

(52) U.S. Cl.
CPC ........ *F16C 33/1085* (2013.01); *F16C 33/743* (2013.01); *F01D 25/18* (2013.01); *F16C 2360/24* (2013.01)

(58) Field of Classification Search
CPC .... F16C 33/743; F16C 27/02; F16C 2360/24; F02B 39/00
See application file for complete search history.

(56) References Cited

U.S. PATENT DOCUMENTS

| | | | | |
|---|---|---|---|---|
| 4,453,837 | A * | 6/1984 | Shimizu | F01D 25/168 384/121 |
| 7,670,056 | B2 * | 3/2010 | Petitjean | F01D 25/16 384/284 |
| 2019/0078509 | A1 * | 3/2019 | Futae | F16C 17/18 |

FOREIGN PATENT DOCUMENTS

| | | |
|---|---|---|
| GB | 2 357 321 | 6/2001 |
| JP | 54-97544 | 7/1979 |
| JP | 54-168456 | 11/1979 |
| JP | 57-61816 | 4/1982 |
| JP | 11-187612 | 7/1999 |
| JP | 2005-133635 | 5/2005 |
| JP | 2008-248706 | 10/2008 |
| JP | 2010-138757 | 6/2010 |
| JP | 2014-15854 A | 1/2014 |
| JP | 2015-48755 | 3/2015 |
| JP | 2016-8600 | 1/2016 |
| JP | 6575678 B2 | 9/2019 |
| KR | 10-1383820 | 4/2014 |
| WO | WO2014/038080 A1 | 3/2014 |
| WO | WO 2016/027617 A1 | 2/2016 |

OTHER PUBLICATIONS

International Search Report dated Dec. 26, 2017 in PCT/JP2017/040986 filed Nov. 14, 2017 (with English Translation).
Combined Chinese Office Action and Search Report dated Jul. 29, 2020 in corresponding Chinese Patent Application No. 201780069509.3 (with English Translation and English Translation of Category of Cited Documents), 18 pages.

* cited by examiner

BEARING STRUCTURE AND TURBOCHARGER

CROSS REFERENCE TO RELATED APPLICATIONS

This application is a continuation application of International Application No. PCT/JP2017/040986, filed on Nov. 14, 2017, which claims priority to Japanese Patent Application No. 2016-226071, filed on Nov. 21, 2016, the entire contents of which are incorporated by reference herein.

BACKGROUND ART

Technical Field

The present disclosure relates to a bearing structure configured to receive a thrust load of a shaft, and to a turbocharger.

Related Art

Hitherto, there has been known a turbocharger to which a shaft is provided. A turbine impeller is provided at one end of the shaft. A compressor impeller is provided at another end of the shaft. In the turbocharger, the turbine impeller is rotated by exhaust gas discharged from an engine. As the turbine impeller rotates, the compressor impeller rotates through intermediation of the shaft. Air increased in pressure by the rotation of the compressor impeller is sent out to the engine.

For example, in a turbocharger described in Patent Literature 1, a semi-floating bearing is provided as a bearing member configured to axially support a shaft. The semi-floating bearing includes a main body portion. An insertion through hole is formed in the main body portion. A shaft is inserted through the insertion through hole. A radial bearing surface is formed on an inner peripheral surface of the insertion through hole. The radial bearing surface receives a radial load. Both end surfaces of the main body portion function as thrust bearing surfaces. The thrust bearing surfaces receive a thrust load from the shaft.

CITATION LIST

Patent Literature

Patent Literature 1: Japanese Patent Application Laid-Open No. JP 2016-8600

SUMMARY

Technical Problem

For example, in a field of rotary machines including the turbocharger described in Patent Literature 1, further improvement in bearing performance is desired.

It is therefore an object of the present disclosure to provide a bearing structure capable of improving the bearing performance and a turbocharger.

Solution to Problem

In order to achieve the above-mentioned object, according to one embodiment of the present disclosure, there is provided a bearing structure, including: a shaft; a first opposed surface, which is formed on the shaft or a member mounted to the shaft; a first bearing portion, which is opposed to the first opposed surface from one end side of the shaft; a second opposed surface, which is formed on the shaft or the member mounted to the shaft, and is positioned on the one end side of the shaft with respect to the first opposed surface and the first bearing portion; and a second bearing portion, which is opposed to the second opposed surface from the one end side of the shaft.

Further, a first minimum clearance amount, which is a clearance amount between the first opposed surface and the first bearing portion when the shaft maximally moves toward the one end side, may be different from a second minimum clearance amount, which is a clearance amount between the second opposed surface and the second bearing portion when the shaft maximally moves toward the one end side.

Further, the bearing structure may further include: a bearing wall portion, which has an insertion through hole for allowing the shaft to be inserted therethrough, and has the second bearing portion formed on an outer side with respect to the insertion through hole in a radial direction of the shaft; and an upper oil-holding portion, which is formed above a center of the insertion through hole in the bearing wall portion, is recessed from the second bearing portion toward the one end side of the shaft, and is opened on an outer periphery of the bearing wall portion.

Further, the bearing structure may further include: a bearing wall portion, which has an insertion through hole for allowing the shaft to be inserted therethrough, and has the second bearing portion formed on an outer side with respect to the insertion through hole in a radial direction of the shaft; and a lower oil-holding portion, which is formed below a center of the insertion through hole in the bearing wall portion, is recessed from the second bearing portion toward the one end side of the shaft, and is opened on an inner peripheral surface of the insertion through hole.

Further, the bearing structure may further include: a third opposed surface, which is formed on the shaft between the first opposed surface and the second opposed surface; and a bearing member, which is configured to receive the shaft inserted therethrough, has a third bearing portion formed on one end surface of the bearing member and opposed to the third opposed surface, and has the first bearing portion formed on another end surface of the bearing member.

Further, the bearing structure may further include: a housing, which is configured to accommodate the bearing member; a mounting hole, which is formed in the housing; a pin hole, which is formed in the bearing member, and is opposed to the mounting hole in a radial direction of the shaft; and a pin, which is fixed to the mounting hole, and has a distal end side inserted into the pin hole.

Further, the bearing structure may further include: a rotary member, which is mounted on the one end side of the shaft with respect to the bearing member, and has the second opposed surface; and a through hole, which is formed in the rotary member, has one end opened on the second opposed surface, and has another end opened on another end side of the shaft with respect to the second opposed surface.

In achieve the above-mentioned object, a turbocharger according to one embodiment of the present disclosure includes the above-mentioned bearing structure.

Effects of Disclosure

According to the present disclosure, the bearing performance can be improved.

DESCRIPTION OF EMBODIMENT

Figure 1:
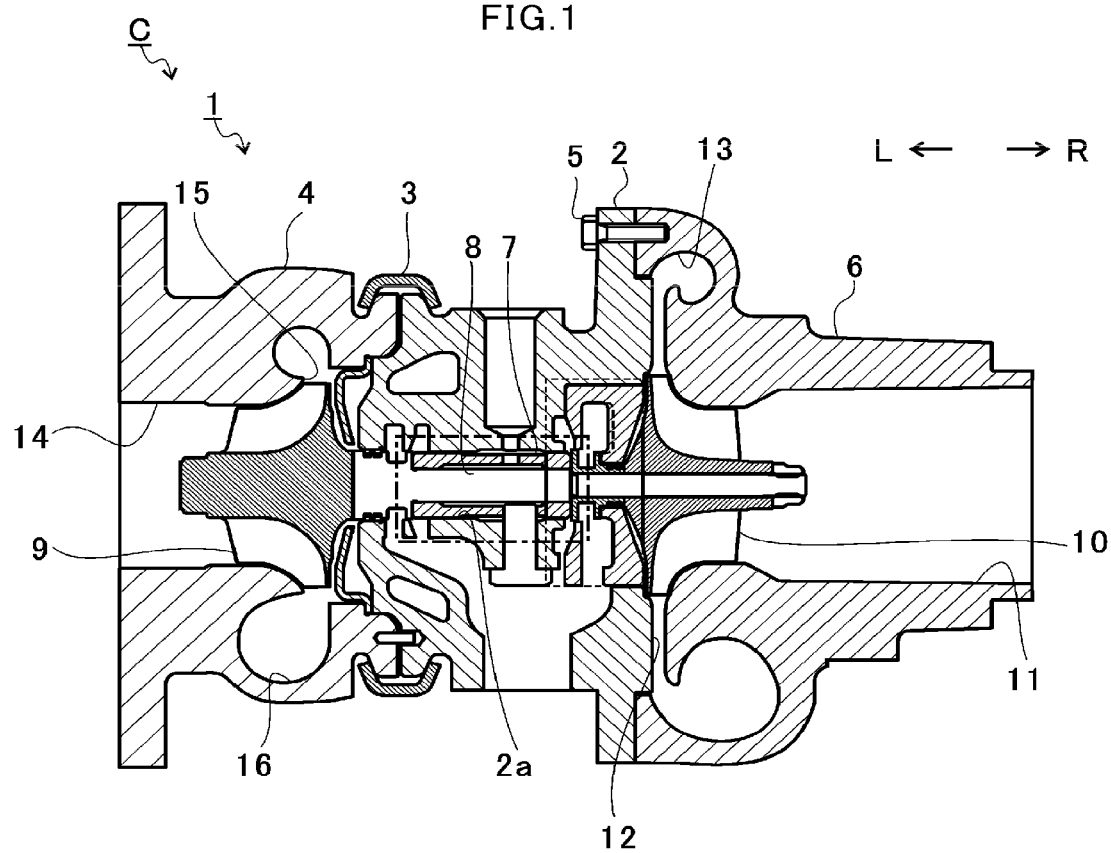
FIG. 1 is a schematic sectional view for illustrating a turbocharger.

Now, with reference to the attached drawings, one embodiment of the present disclosure is described. The dimensions, materials, and other specific numerical values represented in the embodiment are merely examples used for facilitating understanding. Elements having substantially the same functions and configurations herein and in the drawings are denoted by the same reference symbols to omit redundant description thereof.

FIG. 1 is a schematic sectional view for illustrating a turbocharger C. In the following description, the direction indicated by the arrow L illustrated in FIG. 1 corresponds to a left side of the turbocharger C. The direction indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 2 (housing). A turbine housing 4 is coupled to the left side of the bearing housing 2 through with a fastening mechanism 3. A compressor housing 6 is coupled to the right side of the bearing housing 2 with fastening bolts 5. The turbocharger main body 1 integrally includes the bearing housing 2, the turbine housing 4, and the compressor housing 6.

A bearing hole 2a is formed in the bearing housing 2. The bearing hole 2a passes through the turbocharger C in a right-and-left direction. A bearing member 7 is accommodated in the bearing hole 2a. On this occasion, as an example, the bearing member 7 is formed of a semi-floating bearing. A shaft 8 is axially supported by the bearing member 7 so as to be rotatable. A turbine impeller 9 is provided at a left end portion of the shaft 8. The turbine impeller 9 is accommodated in the turbine housing 4 so as to be rotatable. A compressor impeller 10 is provided at a right end portion of the shaft 8. The compressor impeller 10 is accommodated in the compressor housing 6 so as to be rotatable.

A intake port 11 is formed in the compressor housing 6. The intake port 11 is opened on the right side of the turbocharger C. The intake port 11 is connected to an air cleaner (not shown). A diffuser flow passage 12 is formed of opposed surfaces of the bearing housing 2 and the compressor housing 6. The diffuser flow passage 12 is formed in an annular shape so as to extend from an inner side toward an outer side in a radial direction of the shaft 8 (compressor impeller 10). The radially inner side of the diffuser flow passage 12 communicates with the intake port 11 through intermediation of the compressor impeller 10. The diffuser flow passage 12 is configured to increase the pressure of the air sucked from the intake port 11.

A compressor scroll flow passage 13 having an annular shape is formed in the compressor housing 6. The compressor scroll flow passage 13 is positioned on an outer side with respect to the diffuser flow passage 12 in the radial direction of the shaft 8 (compressor impeller 10). The compressor scroll flow passage 13 communicates with an intake port of an engine (not shown) and the diffuser flow passage 12. When the compressor impeller 10 rotates, the air is sucked from the intake port 11 into the compressor housing 6. The air sucked from the intake port 11 is pressurized and accelerated through an action of a centrifugal force in the course of flowing through blades of the compressor impeller 10. Moreover, the air is increased in pressure in the diffuser flow passage 12 and the compressor scroll flow passage 13, and is introduced to the intake port of the engine.

A discharge port 14 is formed in the turbine housing 4. The discharge port 14 is opened on the left side of the turbocharger C. The discharge port 14 is connected to an exhaust gas purification device (not shown). A flow passage 15 is formed in the turbine housing 4. A turbine scroll flow passage 16 having an annular shape is formed on an outer side with respect to the flow passage 15 in the radial direction of the shaft 8 (turbine impeller 9). The turbine scroll flow passage 16 communicates with the flow passage 15 and a gas inflow port (not shown). Exhaust gas discharged from an exhaust manifold of the engine is introduced to the gas inflow port. The exhaust gas introduced from the gas inflow port to the turbine scroll flow passage 16 is introduced to the discharge port 14 through intermediation of the flow passage 15 and the turbine impeller 9. The turbine impeller 9 is rotated by the flow of the exhaust gas. A rotational force of the turbine impeller 9 is transmitted to the compressor impeller 10 through intermediation of the shaft 8. The air is increased in pressure by the rotational force of the compressor impeller 10, and is introduced to the suction port of the engine as described above.

Figure 2:
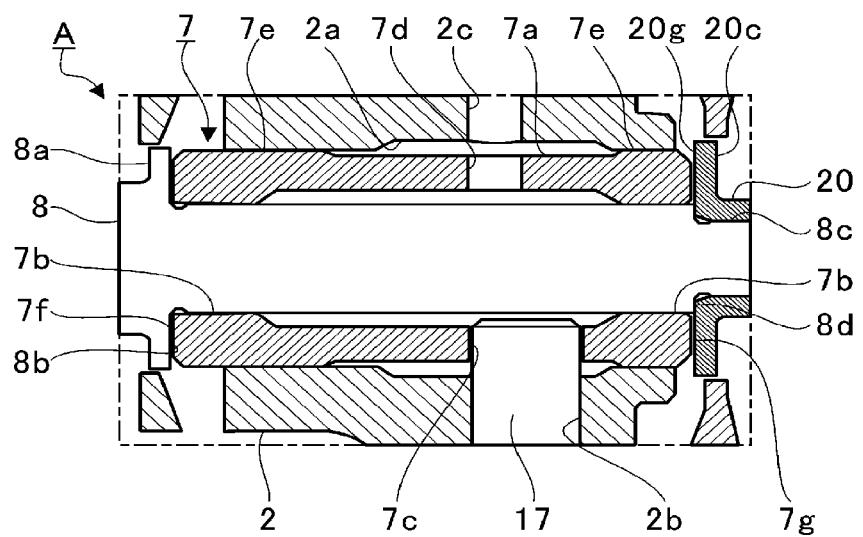
FIG. 2 is an extraction view for illustrating a portion indicated by a one-dot chain line of FIG. 1.

FIG. 2 is an extraction view for illustrating a portion indicated by a one-dot chain line of FIG. 1. The turbocharger C includes a bearing structure A. The bearing structure A is formed so as to receive a radial load and a thrust load of the shaft 8. In the following, detailed description is made of the bearing structure A. The bearing member 7 includes a main body portion 7a having a cylindrical shape. The main body portion 7a is accommodated in the bearing hole 2a. Two of radial bearing surfaces 7b are formed on an inner periphery of the main body portion 7a. The two of radial bearing surfaces 7b are separated from each other in an axial direction of the shaft 8. The shaft 8 is inserted through the main body portion 7a of the bearing member 7. The shaft 8 is axially supported by the two of radial bearing surfaces 7b so as to be rotatable.

A pin hole 7c is formed in the main body portion 7a. The pin hole 7c passes through the main body portion 7a in the radial direction of the shaft 8. The pin hole 7c is positioned between the two of radial bearing surfaces 7b. A mounting hole 2b is formed in the bearing housing 2. The pin hole 7c is opposed to the mounting hole 2b in the radial direction of the shaft 8. A pin 17 is mounted to the mounting hole 2b. A distal end side of the pin 17 enters the pin hole 7c of the bearing member 7. The bearing member 7 is restricted in movement in a rotation direction and the axial direction of the shaft 8 by the pin 17.

An oil hole 7*d* is formed in the main body portion 7*a*. The oil hole 7*d* passes through the main body portion 7*a* from an inner peripheral surface to an outer peripheral surface. For example, an opening of the oil hole 7*d* on the outer peripheral surface side is opposed to an opening of an oil passage 2*c* formed in the bearing housing 2 on a bearing hole 2*a* side. Part of lubricant supplied from the oil passage 2*c* to the bearing hole 2*a* is introduced to an inner periphery of the main body portion 7*a* through the oil hole 7*d*. Moreover, the rest of the lubricant supplied to the bearing hole 2*a* is supplied to a clearance defined between the outer peripheral surface of the main body portion 7*a* and an inner peripheral surface of the bearing hole 2*a*.

Two of damper surfaces 7*e* are formed on the outer peripheral surface of the main body portion 7*a*. The two of damper surfaces 7*e* are separated from each other in the axial direction of the shaft 8. The two of damper surfaces 7*e* are positioned on an outer side the radial bearing surfaces 7*b* in the radial direction, respectively. The damper surfaces 7*e* are portions of the outer peripheral surface of the main body portion 7*a* and each define a narrowest clearance with respect to the inner peripheral surface of the bearing hole 2*a*. The lubricant supplied to the clearance defined between the outer peripheral surface of the main body portion 7*a* and the inner peripheral surface of the bearing hole 2*a* functions as a damper. As a result, a vibration of the shaft 8 is suppressed.

A large-diameter portion 8*a* is formed on the shaft 8. The large-diameter portion 8*a* is positioned in the bearing hole 2*a*. For example, the large-diameter portion 8*a* is larger in outer diameter than a portion of the shaft 8 inserted through the main body portion 7*a* of the bearing member 7. A first opposed surface 8*b* is formed on the large-diameter portion 8*a*. The first opposed surface 8*b* faces one end side (the right side in FIG. 2, that is, a compressor impeller 10 side) of the shaft 8. A first bearing portion 7*f* is formed in the main body portion 7*a* of the bearing member 7. The first bearing portion 7*f* faces another end side (the left side in FIG. 2, that is, a turbine impeller 9 side) of the shaft 8. The first bearing portion 7*f* is an end surface of the main body portion 7*a* on a turbine housing 4 side. The first bearing portion 7*f* is opposed to the first opposed surface 8*b* from the one end side of the shaft 8. That is, the first bearing portion 7*f* of the bearing member 7 is opposed to the first opposed surface 8*b* of the shaft 8 in the axial direction.

A small-diameter portion 8*c* is formed on the one end side (the right side in FIG. 2, that is, the compressor impeller 10 side) of the shaft 8. The small-diameter portion 8*c* is smaller in outer diameter than the portion inserted through the main body portion 7*a* of the bearing member 7. A step portion 8*d* is formed on the shaft 8 due to the difference in outer diameter between the portion inserted through the main body portion 7*a* and the small-diameter portion 8*c*.

Figure 3:
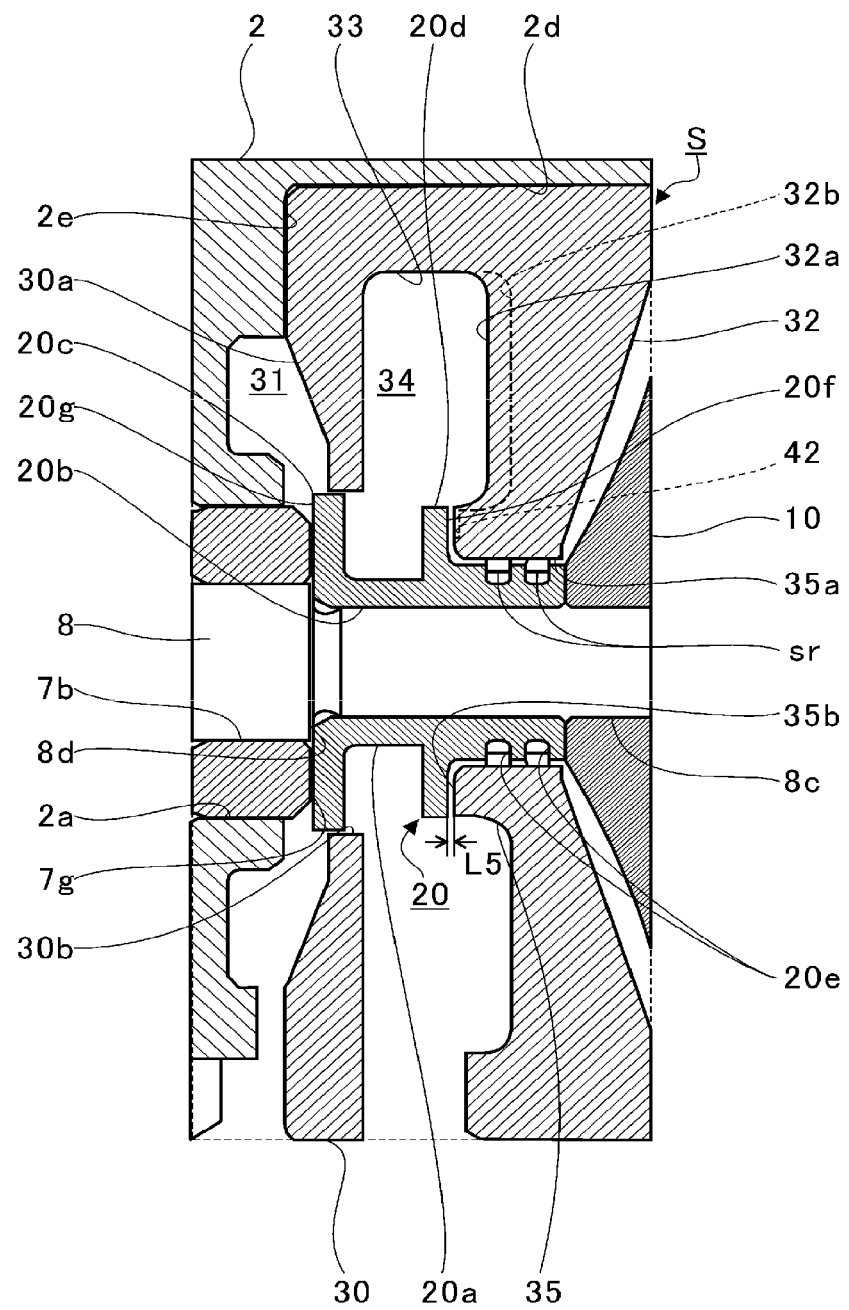
FIG. 3 is an extraction view for illustrating a portion indicated by a broken line of FIG. 1.

FIG. 3 is an extraction view for illustrating a portion indicated by a broken line of FIG. 1. A rotary member 20 (a member mounted to the shaft) is provided at the small-diameter portion 8*c* of the shaft 8. The rotary member 20 is positioned on the one end side of the shaft 8 with respect to the bearing member 7. The compressor impeller 10 is provided on the one end side of the shaft 8 with respect to the rotary member 20. The rotary member 20 is sandwiched between the bearing member 7 and the compressor impeller 10. The rotary member 20 includes a main body 20*a* having a cylindrical shape. An insertion hole 20*b* passing through the main body 20*a* from one end to another end is formed in the main body 20*a*. The shaft 8 is inserted through the insertion hole 20*b*. A flange portion 20*c* and a scattering portion 20*d* are formed on an outer periphery of the main body 20*a*.

The flange portion 20*c* and the scattering portion 20*d* are portions protruding radially outward from an outer peripheral surface of the main body 20*a*. The flange portion 20*c* is formed at an end portion of the main body 20*a* on the turbine impeller 9 side. The scattering portion 20*d* is formed at a position of the main body 20*a* equally spaced apart from the one end and the another end in the axial direction (in a vicinity of the center in the axial direction). The flange portion 20*c* and the scattering portion 20*d* are separated from each other in the axial direction of the shaft 8. An outer diameter of the flange portion 20*c* is larger than an outer diameter of the scattering portion 20*d*. However, the outer diameter of the flange portion 20*c* may be equal to or smaller than the outer diameter of the scattering portion 20*d*. In this embodiment, the flange portion 20*c* is slightly larger than the scattering portion 20*d* in thickness (wall thickness) in the axial direction of the shaft 8. However, the thickness of the flange portion 20*c* may be equal to or smaller than the thickness of the scattering portion 20*d*.

The main body 20*a* has different outer diameters on a distal end side and a base end side with respect to the scattering portion 20*d*. The outer diameter on the compressor impeller 10 side (distal end side) with respect to the scattering portion 20*d* is larger than the outer diameter on a flange portion 20*c* side (base end side) with respect to the scattering portion 20*d*. However, the outer diameter of the main body 20*a* may be the same on the distal end side and the base end side with respect to the scattering portion 20*d*. Moreover, the outer diameter on the compressor impeller 10 side (distal end side) with respect to the scattering portion 20*d* may be smaller than the outer diameter on the flange portion 20*c* side (base end side) with respect to the scattering portion 20*d*. Two of seal grooves 20*e* are formed in an outer peripheral surface of the main body 20*a* on the compressor impeller 10 side (distal end side) with respect to the scattering portion 20*d*.

An opening portion 2*d* is formed in the bearing housing 2. The opening portion 2*d* is a hole formed in a surface of the bearing housing 2 to which the compressor housing 6 is mounted. The opening portion 2*d* is positioned between the bearing hole 2*a* and the compressor housing 6. An inner diameter of the opening portion 2*d* is larger than an inner diameter of the bearing hole 2*a*. An abutment surface 2*e* is formed in the bearing housing 2 due to a difference in outer diameter between the bearing hole 2*a* and the opening portion 2*d*. The abutment surface 2*e* is a surface substantially perpendicular to the axial direction of the shaft 8.

A seal member S is provided in the opening portion 2*d* of the bearing housing 2. The seal member S is mounted to the opening portion 2*d*, for example, through press fitting. However, the seal member S may be mounted to the opening portion 2*d* through mounting members such as bolts, adhesive, or the like. The seal member S includes a partition wall portion 30. A shape of the partition wall portion 30 in plan view is circular. One flat surface of the partition wall portion 30 of the seal member S is held in abutment against the abutment surface 2*e*. A part of the partition wall portion 30 on an outer side in the radial direction is held in abutment against the abutment surface 2*e*. An inclined surface 30*a* is formed on a flat surface of the partition wall portion 30 opposed to the abutment surface 2*e*. The inclined surface 30*a* inclines in a direction of separating from the abutment surface 2*e* more on an inner side in the radial direction. A space 31 is defined between the abutment surface 2e and the partition wall portion 30. The space 31 extends in an annular shape on an outer side with respect to the bearing member 7 in the radial direction, and is opened below the shaft 8.

A center hole 30b is formed at the center of the partition wall portion 30. The center hole 30b passes through the partition wall portion 30 in the axial direction of the shaft 8. The shaft 8 and the rotary member 20 are inserted through the center hole 30b. A part of the outer peripheral surface of the flange portion 20c of the rotary member 20 is opposed to an inner peripheral surface of the center hole 30b in the radial direction. A clearance is slightly defined between the outer peripheral surface of the flange portion 20c and the inner peripheral surface of the center hole 30b. A portion of the flange portion 20c on the one end side (compressor impeller 10 side) of the shaft 8 is positioned in the center hole 30b. A portion of the flange portion 20c on the another end side (turbine impeller 9 side) of the shaft 8 is positioned on a bearing member 7 side with respect to the center hole 30b.

The seal member S includes a seal wall portion 32. The seal wall portion 32 includes a flat surface portion 32a. A shape of the flat surface portion 32a in plan view is circular. The seal wall portion 32 is separated from the partition wall portion 30 in the axial direction of the shaft 8. The flat surface portion 32a of the seal wall portion 32 is opposed to the partition wall portion 30. An extension portion 33 is formed in the seal member S. The extension portion 33 extends from the partition wall portion 30 to the seal wall portion 32. The extension portion 33 connects parts of the partition wall portion 30 and the seal wall portion 32 on an outer side in the radial direction with each other.

A space 34 is defined in the seal member S. The space 34 is surrounded by the partition wall portion 30, the seal wall portion 32, and the extension portion 33. The space 34 is defined between the partition wall portion 30 and the seal wall portion 32. The extension portion 33 extends in a circumferential direction along the inner peripheral surface of the opening portion 2d. A cutout is formed in the extension portion 33 below the shaft 8. Thus, the space 34 is opened below the shaft 8.

A bearing wall portion 35 is formed on a center side of the seal wall portion 32. The bearing wall portion 35 is a portion of the seal wall portion 32 protruding toward the inner side in the radial direction of the shaft 8 with respect to the partition wall portion 30. An insertion through hole 35a is formed in the bearing wall portion 35. The insertion through hole 35a passes through the bearing wall portion 35 in the axial direction of the shaft 8. The shaft 8 and the rotary member 20 are inserted through the insertion through hole 35a. An outer peripheral surface of the rotary member 20 on the distal end side with respect to the scattering portion 20d is opposed to an inner peripheral surface of the insertion through hole 35a in the radial direction. A clearance is slightly defined between the outer peripheral surface of the main body 20a and the inner peripheral surface of the insertion through hole 35a. The two of seal grooves 20e formed in the main body 20a of the rotary member 20 are positioned in the insertion through hole 35a. An annular seal ring sr is provided in each of the two of seal grooves 20e. An outer peripheral surface of the seal ring sr is pressed against the inner peripheral surface of the insertion through hole 35a. An inner peripheral side of the seal ring sr enters the seal groove 20e. However, the inner peripheral surface of the seal ring sr and a bottom portion of the seal groove 20e are separated from each other in the radial direction of the shaft 8.

A second opposed surface 20f is formed on the scattering portion 20d of the rotary member 20. The second opposed surface 20f is an annular flat surface extending from the outer peripheral surface of the main body 20a in the radial direction. The second opposed surface 20f faces the one end side (compressor impeller 10 side) of the shaft 8. That is, the second opposed surface 20f faces in the same direction as the first opposed surface 8b formed on the large-diameter portion 8a (see FIG. 2). The second opposed surface 20f is positioned on the one end side (compressor impeller 10 side) of the shaft 8 with respect to the first opposed surface 8b and the first bearing portion 7f of the bearing member 7.

A second bearing portion 35b is annular and is formed on the bearing wall portion 35. The second bearing portion 35b is opposed to the second opposed surface 20f from the one end side (compressor impeller 10 side) of the shaft 8. The second bearing portion 35b is positioned on an outer side with respect to the insertion through hole 35a in the radial direction of the shaft 8. That is, the insertion through hole 35a is formed in the bearing wall portion 35. The shaft 8 is inserted through the insertion through hole 35a. The second bearing portion 35b is formed on an outer side with respect to the insertion through hole 35a of the bearing wall portion 35 in the radial direction of the shaft 8. The bearing wall portion 35 protrudes toward a partition wall portion 30 side with respect to the flat surface portion 32a of the seal wall portion 32. Thus, the second bearing portion 35b is positioned on the partition wall portion 30 side with respect to the flat surface portion 32a of the seal wall portion 32. The space 34 is positioned on an outer side with respect to the second bearing portion 35b and the second opposed surface 20f in the radial direction. A clearance is defined between the second opposed surface 20f and the second bearing portion 35b in the axial direction of the shaft 8. The clearance defined between the second opposed surface 20f and the second bearing portion 35b communicates with the space 34.

A third opposed surface 20g is formed on the flange portion 20c of the rotary member 20. The third opposed surface 20g is formed between the first opposed surface 8b formed on the large-diameter portion 8a and the second opposed surface 20f formed on the rotary member 20 (scattering portion 20d). The third opposed surface 20g is an annular flat surface extending from the insertion hole 20b in the radial direction. The third opposed surface 20g faces another end side (turbine impeller 9 side) of the shaft 8. That is, the third opposed surface 20g faces in a direction opposed to the first opposed surface 8b formed on the large-diameter portion 8a (see FIG. 2). In other words, the third opposed surface 20g faces in a direction opposite to the first opposed surface 8b and the second opposed surface 20f. An inner peripheral side of the third opposed surface 20g is held in contact with the step portion 8d of the shaft 8 in the axial direction. An outer peripheral side of the third opposed surface 20g protrudes with respect to the outer peripheral surface of the main body portion 7a of the bearing member 7 in the radial direction.

A third bearing portion 7g is formed in the main body portion 7a of the bearing member 7. The third bearing portion 7g faces the one end side (compressor impeller 10 side) of the shaft 8. The third bearing portion 7g is an end surface of the main body portion 7a on the compressor impeller 10 side. The third bearing portion 7g is opposed to the third opposed surface 20g from the another end side (turbine impeller 9 side) of the shaft 8. That is, the third bearing portion 7g of the bearing member 7 is opposed to the third opposed surface 20g of the rotary member 20 in the axial direction. The third bearing portion 7g opposed to the third opposed surface 20g is formed on one end surface of the main body portion 7a (bearing member 7) configured to receive the shaft 8 inserted therethrough. The first bearing portion 7f opposed to the first opposed surface 8b is formed on another end surface of the main body portion 7a.

Figure 4:
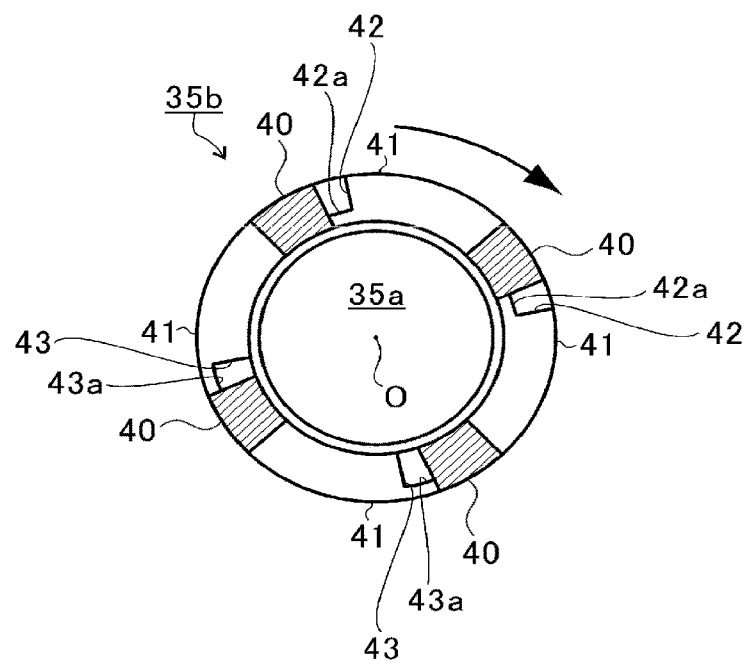
FIG. 4 is an explanatory view for illustrating an example of a second bearing portion.

FIG. 4 is an explanatory view for illustrating an example of the second bearing portion 35b. A direction of an arrow illustrated in FIG. 4 indicates a rotation direction of the shaft 8. The second bearing portion 35b formed on the bearing wall portion 35 extends in an annular shape in the rotation direction of the shaft 8. A plurality of (four in this case) pads 40 (indicated by hatching in the FIG. 4) are formed in the second bearing portion 35b. On this occasion, each of the pads 40 are arranged so as to be separated from each other at equal intervals in the rotation direction of the shaft 8.

A tapered surface 41 is formed between the two of pads 40 adjacent to each other in the rotation direction of the shaft 8. The tapered surfaces 41 are portions having a protruding height smaller than that of the pads 40. The protruding height of the tapered surface 41 continuously increases from a rear side to a front side in the rotation direction of the shaft 8. That is, a rear end portion of the tapered surface 41 in the rotation direction of the shaft 8 forms the largest step with respect to the pad 40 which is adjacent. A front end portion of the tapered surface 41 in the rotation direction of the shaft 8 flushes with the pad 40 which is adjacent.

Two of upper oil-holding portions 42 and two of lower oil-holding portions 43 are formed in the second bearing portion 35b. The upper oil-holding portions 42 and the lower oil-holding portions 43 are adjacent to the pads 40. The upper oil-holding portions 42 and the lower oil-holding portions 43 are grooves formed in the tapered surface 41. The upper oil-holding portions 42 are adjacent to the two of pads 40 above a center O of the insertion through hole 35a on the front side in the rotation direction of the shaft 8. Thus, the upper oil-holding portions 42 are formed above the center of the insertion through hole 35a in the bearing wall portion 35.

The upper oil-holding portion 42 is recessed from the second bearing portion 35b toward the one end side (compressor impeller 10 side) of the shaft 8. The upper oil-holding portion 42 is opened on an outer periphery of the second bearing portion 35b (bearing wall portion 35). In other words, the upper oil-holding portion 42 is opened toward the outer side in the radial direction. A bottom portion 42a is formed on an inner side of the upper oil-holding portion 42 in the radial direction of the shaft 8. The upper oil-holding portion 42 does not pass through in any of the axial direction and the radial direction of the shaft 8.

The lower oil-holding portions 43 are adjacent to the two of pads 40 below the center O of the insertion through hole 35a on the front side in the rotation direction of the shaft 8. Thus, the lower oil-holding portions 43 are formed below the center O of the insertion through hole 35a in the bearing wall portion 35. The lower oil-holding portion 43 is recessed from the second bearing portion 35b toward the one end side (compressor impeller 10 side) of the shaft 8. The lower oil-holding portion 43 is opened on an inner peripheral surface of the insertion through hole 35a. In other words, the lower oil-holding portion 43 is opened toward the inner side in the radial direction. A bottom portion 43a is formed on an outer side of the lower oil-holding portion 43 in the radial direction of the shaft 8. The lower oil-holding portion 43 does not pass through in any of the axial direction and the radial direction of the shaft 8.

As illustrated in FIG. 3, an oil feed groove 32b is formed in the flat surface portion 32a of the seal wall portion 32. The oil feed groove 32b is a groove extending from the extension portion 33 to the bearing wall portion 35 in the radial direction of the shaft 8. A width (a width in the rotation direction of the shaft 8) of the oil feed groove 32b is larger than a width (a width in the rotation direction of the shaft 8) of the upper oil-holding portion 42. Moreover, positions of the oil feed groove 32b and the upper oil-holding portion 42 partially overlap each other in the rotation direction of the shaft 8. That is, the oil feed groove 32b is positioned on an outer side with respect to the upper oil-holding portion 42 in the radial direction. A radially inner side of the oil feed groove 32b extends to the second bearing portion 35b of the bearing wall portion 35. Thus, the oil feed groove 32b formed in the seal wall portion 32 communicates with the upper oil-holding portion 42 formed in the second bearing portion 35b.

The number of the oil feed grooves 32b is not limited. The oil feed groove 32b may be formed only for one of the upper oil-holding portions 42, or may be formed for each of the two of upper oil-holding portions 42. Further, an oil feed groove 32b positioned on an outer side with respect to the lower oil-holding portion 43 in the radial direction may be formed. Moreover, a depth, a width, and a shape of the oil feed groove 32b are not particularly limited. For example, the oil feed groove 32b may have a constant width from the inner side to the outer side in the radial direction. The width of the oil feed groove 32b may increase toward the outer side in the radial direction.

Moreover, shapes of the first bearing portion 7f and the third bearing portion 7g are also not particularly limited. In this embodiment, it is assumed that the first bearing portion 7f and the third bearing portion 7g include the pads 40 and the tapered surfaces 41 of the second bearing portion 35b.

Next, with reference to FIG. 2 and FIG. 3, description is made of an action of the bearing structure A. As illustrated in FIG. 2, a movement of the main body portion 7a of the bearing member 7 in the axial direction is restricted by the pin 17. The bearing member 7 (main body portion 7a) is sandwiched between the large-diameter portion 8a and the rotary member 20 in the axial direction. Part of the lubricant that has lubricated the radial bearing surface 7b on the left side in FIG. 2 is discharged from the radial bearing surface 7b to a first bearing portion 7f side. The lubricant is discharged from the inner side toward the outer side of the first bearing portion 7f in the radial direction through an action of a centrifugal force generated by the rotation of the shaft 8. The lubricant forms an oil film between the first bearing portion 7f and the first opposed surface 8b.

Part of the lubricant that has lubricated the radial bearing surface 7b on the right side in FIG. 2 is discharged from the radial bearing surface 7b to a third bearing portion 7g side. The lubricant is discharged from the inner side toward the outer side of the third bearing portion 7g in the radial direction through the action of the centrifugal force generated by the rotation of the shaft 8. The lubricant forms an oil film between the third bearing portion 7g and the third opposed surface 20g. When the shaft 8 is moved to the right side in FIG. 2, the shaft 8 is supported by an oil film pressure between the first bearing portion 7f and the first opposed surface 8b. That is, the first bearing portion 7f functions as a thrust bearing that receives the thrust load from the shaft 8. When the shaft 8 is moved to the left side in FIG. 2, the shaft 8 is supported by an oil film pressure between the third bearing portion 7g and the third opposed surface 20g. That is, the third bearing portion 7g functions as a thrust bearing that receives the thrust load from the shaft 8. In other words, the both end surfaces of the main body portion 7a in the axial direction function as thrust bearings that receive the thrust load.

As illustrated in FIG. 3, the lubricant that has been introduced to the clearance between the third bearing portion 7g and the third opposed surface 20g is scattered in the space 31 by the rotation of the rotary member 20. Part of the lubricant that has been scattered in the space 31 is discharged from the lower side of the space 31 to a bottom portion side of the bearing housing 2. Moreover, part of the lubricant that has been scattered in the space 31 is introduced from the clearance between the center hole 30b of the partition wall portion 30 and the flange portion 20c of the rotary member 20 to the compressor impeller 10 side.

Part of the lubricant that has been introduced to the compressor impeller 10 side with respect to the flange portion 20c is scattered in the space 34 by the rotation of the rotary member 20. Part of the lubricant that has been scattered in the space 34 is discharged from the lower side of the space 34 to the bottom portion side of the bearing housing 2. Part of the lubricant that has been scattered above the shaft 8 in the space 34 adheres to the flat surface portion 32a of the seal wall portion 32. Part of the lubricant that adheres to the flat surface portion 32a reaches the bearing wall portion 35 by the gravity. The lubricant that has reached the bearing wall portion 35 enters the clearance between the second bearing portion 35b and the second opposed surface 20f. The lubricant forms an oil film between the second bearing portion 35b and the second opposed surface 20f. When the shaft 8 is moved to the right side in FIG. 2, the shaft 8 is supported by an oil film pressure between the second bearing portion 35b and the second opposed surface 20f. That is, the second bearing portion 35b functions as a thrust bearing that receives the thrust load from the shaft 8.

The upper oil-holding portions 42 are formed in the second bearing portion 35b. The upper oil-holding portions 42 opened on the outer peripheral surface of the bearing wall portion 35. Therefore, the lubricant is likely to enter the clearance between the second bearing portion 35b and the second opposed surface 20f. The upper oil-holding portion 42 includes the bottom portion 42a. The upper oil-holding portions 42 do not pass through in the radial direction. Therefore, the lubricant that has entered the upper oil-holding portions 42 is likely to be introduced to the tapered surfaces 41 and the pads 40. Moreover, the oil feed groove 32b formed in the flat surface portion 32a communicates with the upper oil-holding portions 42. Thus, the lubricant is likely to be introduced to the upper oil-holding portions 42.

The lower oil-holding portions 43 are formed in the second bearing portion 35b. The lower oil-holding portions 43 are opened to the insertion through hole 35a. Therefore, the lubricant is likely to enter the lower oil-holding portions 43 below the shaft 8. The lower oil-holding portion 43 includes the bottom portion 43a. The lower oil-holding portions 43 do not pass through in the radial direction. Therefore, the lubricant that has entered the lower oil-holding portions 43 is likely to be introduced to the tapered surfaces 41 and the pads 40. The seal ring sr is provided in the insertion through hole 35a. Leakage of the lubricant that has entered the clearance between the second bearing portion 35b and the second opposed surface 20f to the compressor impeller 10 side is suppressed by the seal ring sr.

With the turbocharger C described above, when the shaft 8 moves from the turbine impeller 9 side to the compressor impeller 10 side, the first bearing portion 7f and the second bearing portion 35b function as the thrust bearings. Thus, as compared with a case in which only the first bearing portion 7f is provided, a thrust capacity increases, and a bearing performance is improved.

An area over which the first bearing portion 7f and the first opposed surface 8b are opposed to each other in the axial direction may be the same as or different from an area over which the second bearing portion 35b and the second opposed surface 20f are opposed to each other in the axial direction. Moreover, a relationship between the clearance amount between the first opposed surface 8b and the first bearing portion 7f and the clearance amount between the second opposed surface 20f and the second bearing portion 35b is not particularly limited.

Figure 5:
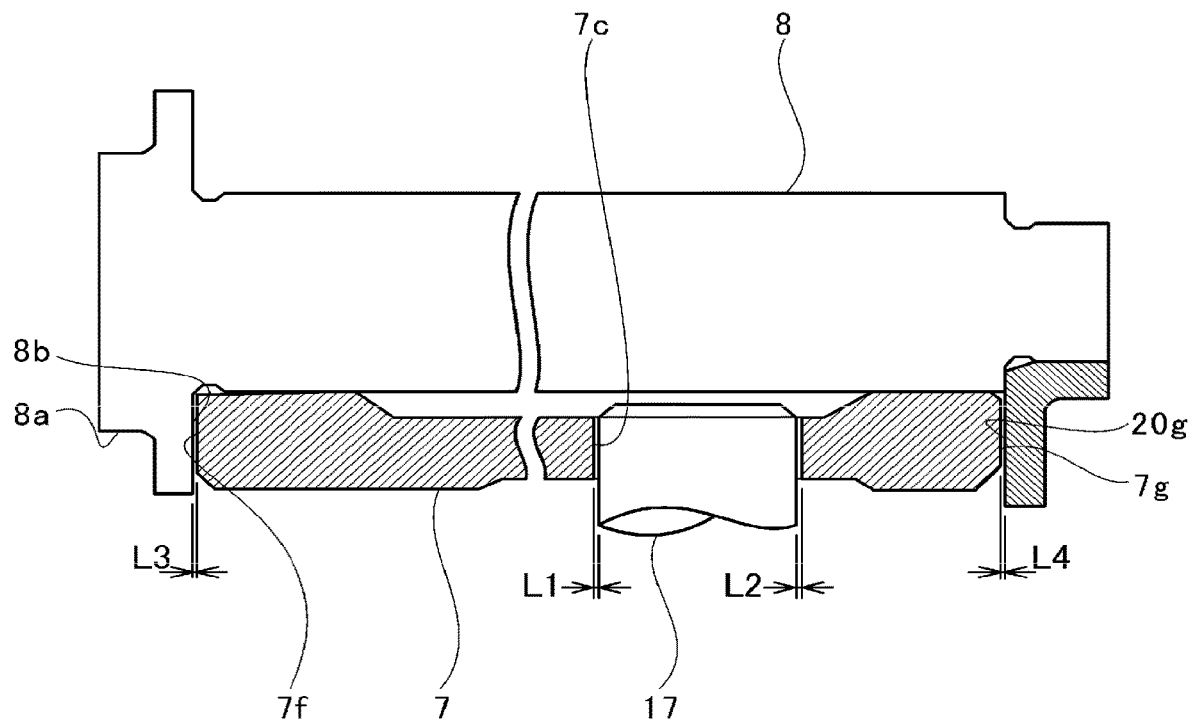
FIG. 5 is an explanatory view for illustrating a total clearance amount.

FIG. 5 is an explanatory view for illustrating a total clearance amount. The movement of the bearing member 7 in the axial direction is restricted by the pin 17. A clearance amount between the outer peripheral surface of the pin 17 and the inner peripheral surface of the pin hole 7c is a sum of L1 and L2. The bearing member 7 moves in the axial direction in a range of the clearance amount (L1+L2) between the outer peripheral surface of the pin 17 and the inner peripheral surface of the pin hole 7c. Moreover, the shaft 8 moves in the axial direction with respect to the bearing member 7 in a range of a total amount (L3+L4) of the clearance (L3) between the first bearing portion 7f and the first opposed surface 8b and the clearance (L4) between the third bearing portion 7g and the third opposed surface 20g. That is, the shaft 8 moves in the axial direction in a range of a total clearance amount (L1+L2+L3+L4).

When the shaft 8 maximally moves to the one end side (compressor impeller 10 side), the clearance amount (L3) between the first opposed surface 8b and the first bearing portion 7f is minimum (first minimum clearance amount). Moreover, the clearance amount (see L5 of FIG. 3) between the second bearing portion 35b and the second opposed surface 20f changes in accordance with the position of the shaft 8 in the axial direction. When the shaft 8 maximally moves to the one end side (compressor impeller 10 side), the clearance amount (L5) between the second opposed surface 20f and the second bearing portion 35b is minimum (second minimum clearance amount).

When the first minimum clearance amount (L3) and the second minimum clearance amount (L5) are at approximately the same level, both the first bearing portion 7f and the second bearing portion 35b receive the thrust load. In this case, a thrust capacity can be increased without increasing the size of the first bearing portion 7f in the radial direction. That is, the thrust capacity can be increased, thereby being capable of improving the bearing performance while the size of the turbocharger C is reduced.

When the first minimum clearance amount (L3) and the second minimum clearance amount (L5) are different from each other, actions of the thrust load on the first bearing portion 7f and the second bearing portion 35b are different from each other. For example, when the first minimum clearance amount (L3) is smaller than the second minimum clearance amount (L5), a larger thrust load acts on the first bearing portion 7f than on the second bearing portion 35b. In other words, when the second minimum clearance amount (L5) is larger than the total clearance amount (L1+L2+L3+L4), a larger thrust load acts on the first bearing portion 7f than on the second bearing portion 35b.

There is such a case that the total clearance amount (L1+L2+L3+L4) of the shaft 8 increases after a long period of operation of the turbocharger C. When the total clearance amount (L1+L2+L3+L4) increases, the movement range of the shaft 8 in the axial direction increases. It is assumed that the second minimum clearance amount (L5) is set to be larger than the first clearance amount (L3) (total clearance amount (L1+L2+L3+L4)) so that only the first bearing portion 7f functions as the thrust bearing in an initial state. In this case, only the first bearing portion 7f functions as the thrust bearing in an initial state. Then, when the total clearance amount (L1+L2+L3+L4) of the shaft 8 increases, the second bearing portion 35b additionally functions as the thrust bearing. Moreover, it is assumed that the first minimum clearance amount (L3) is set to be larger than the second minimum clearance amount (L5) so that only the second bearing portion 35b functions as the thrust bearing. In this case, only the second bearing portion 35b functions as the thrust bearing in the initial state. The first bearing portion 7f additionally functions as the thrust bearing. As described above, the relationship among the respective clearance amounts L1 to L5 only needs to be designed in accordance with an application.

Figure 6:
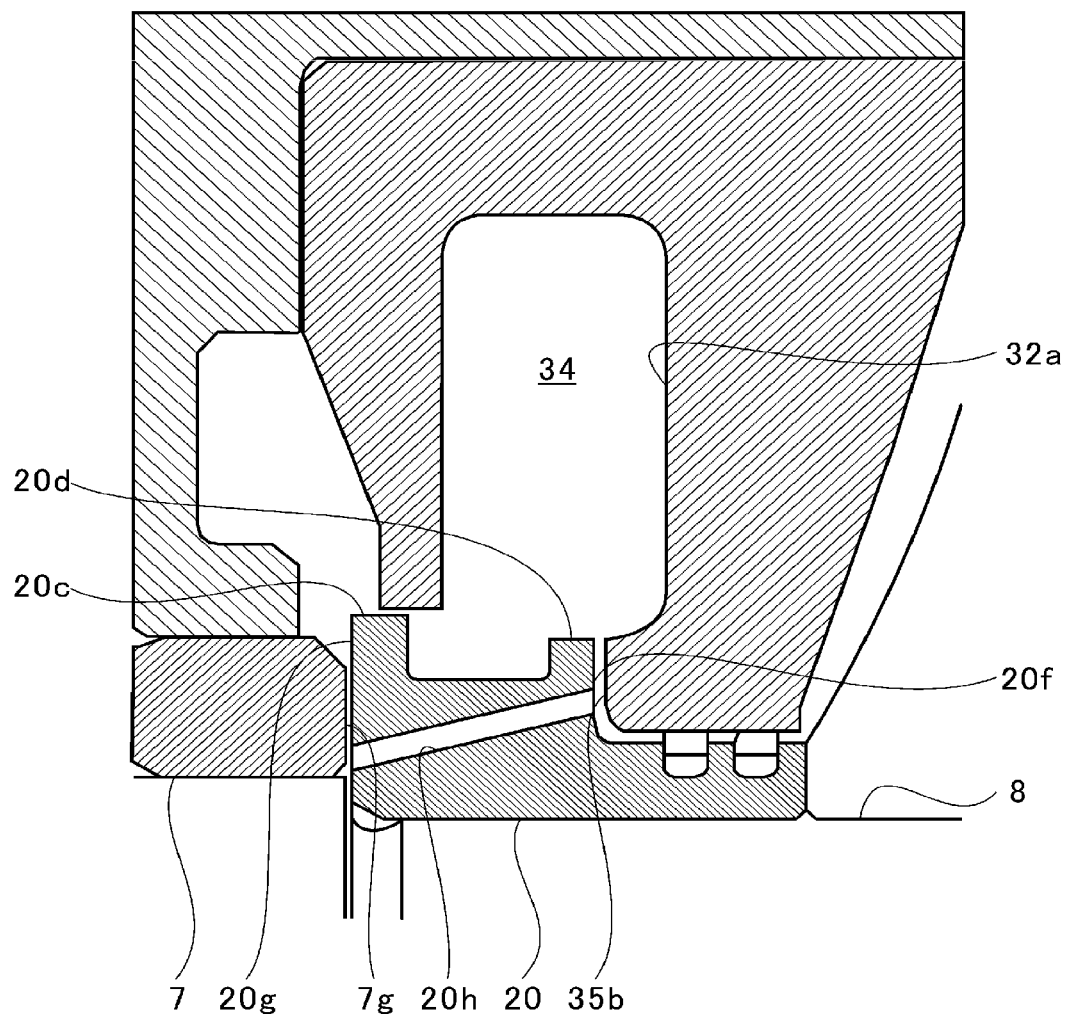
FIG. 6 is an explanatory view for illustrating a first modification example.

FIG. 6 is an explanatory view for illustrating a first modification example. According to the first modification example, the outer peripheral surface between the flange portion 20c and the scattering portion 20d of the main body 20a of the rotary member 20 in the embodiment described above is positioned on an outer side with respect to the inner peripheral surface of the insertion through hole 35a in the radial direction. A through hole 20h is formed in the main body 20a. The configurations other than the main body 20a and the through hole 20h of the rotary member 20 are the same as those of the embodiment described above. The rotary member 20 is provided on the one end side (compressor impeller 10 side) of the shaft 8 with respect to the bearing member 7. The flange portion 20c and the scattering portion 20d are formed on the rotary member 20. The second opposed surface 20f is formed on the scattering portion 20d. The third opposed surface 20g is formed on the flange portion 20c.

The through hole 20h passes through the main body 20a from the second opposed surface 20f to the third opposed surface 20g. That is, the through hole 20h has one end opened on the second opposed surface 20f, and has another end opened on a third opposed surface 20g side (another end side of the shaft 8, that is, on the turbine impeller 9 side) with respect to the second opposed surface 20f. The opening on the third opposed surface 20g side of the through hole 20h is positioned on an inner side with respect to the opening on the second opposed surface 20f side in the radial direction. The second bearing portion 35b is positioned on an extension (compressor impeller 10 side) of the through hole 20h. The through hole 20h causes the lubricant to flow out from the clearance between the third bearing portion 7g and the third opposed surface 20g to the second bearing portion 35b. The lubricant is sufficiently supplied to the second bearing portion 35b by the through hole 20h. Only one through hole 20h may be formed in the flange portion 20c. Alternatively, a plurality of through holes 20h may be formed in the rotation direction of the shaft 8 in the flange portion 20c.

Figure 7:
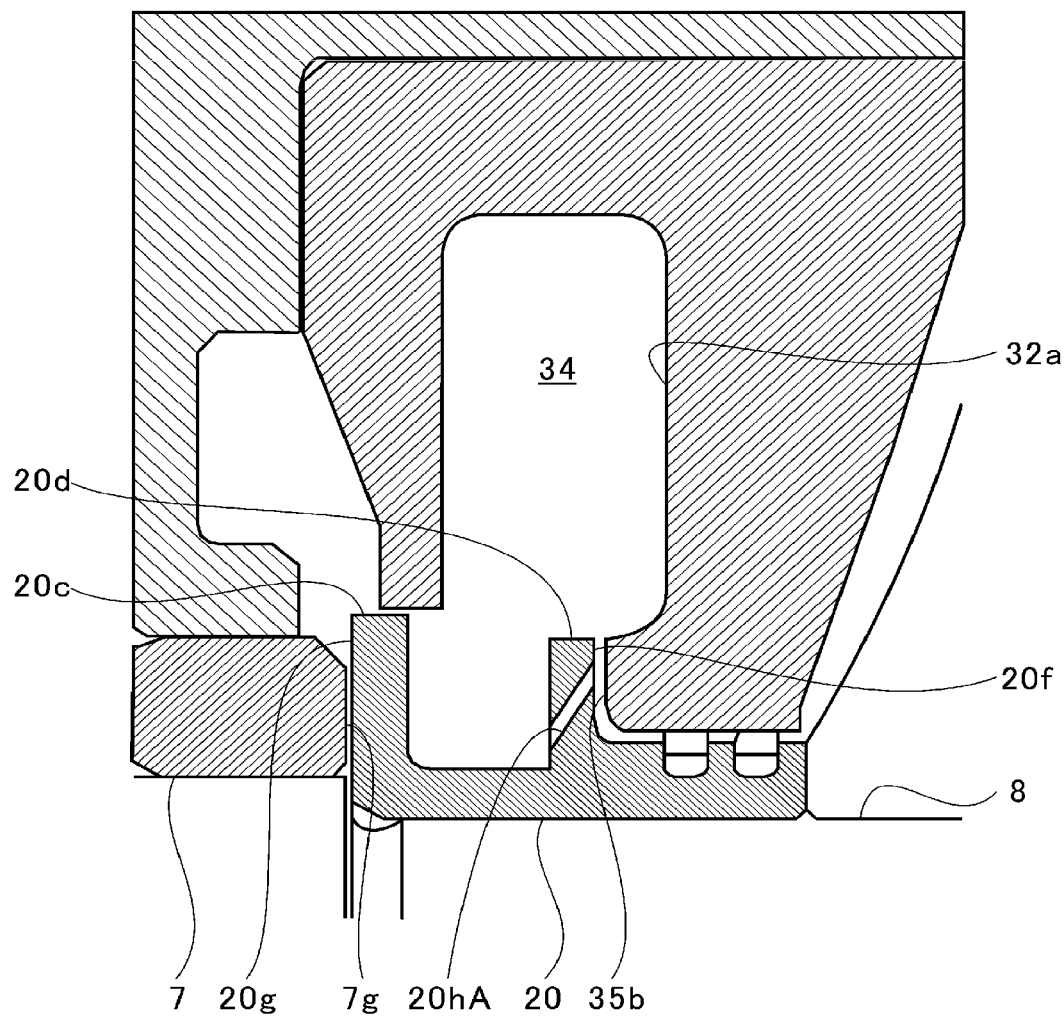
FIG. 7 is an explanatory view for illustrating a second modification example.

FIG. 7 is an explanatory view for illustrating a second modification example. According to the second modification example, a through hole 20hA is formed in the scattering portion 20d. Configurations other than the through hole 20hA are the same as those of the embodiment described above. The rotary member 20 is provided on the one end side (compressor impeller 10 side) of the shaft 8 with respect to the bearing member 7. The flange portion 20c and the scattering portion 20d are formed on the rotary member 20. The second opposed surface 20f is formed on the scattering portion 20d. The third opposed surface 20g is formed on the flange portion 20c. The through hole 20hA is formed in the scattering portion 20d.

The through hole 20hA passes through the scattering portion 20d from one end side to another end side. That is, the through hole 20hA has one end opened on the second opposed surface 20f, and has another end opened on the third opposed surface 20g side (another end side of the shaft 8, that is, on the turbine impeller 9 side) with respect to the second opposed surface 20f. The opening on the third opposed surface 20g side of the through hole 20hA is positioned on an inner side with respect to the opening on the second opposed surface 20f side in the radial direction. The second bearing portion 35b is positioned on an extension (compressor impeller 10 side) of the through hole 20hA. The through hole 20hA causes the lubricant to flow out from the clearance between the flange portion 20c and the scattering portion 20d to the second bearing portion 35b. The lubricant is sufficiently supplied to the second bearing portion 35b by the through hole 20hA. Only one through hole 20hA may be formed in the scattering portion 20d. Alternatively, a plurality of through holes 20hA may be formed in the rotation direction of the shaft 8 in the scattering portion 20d.

Figure 8A:
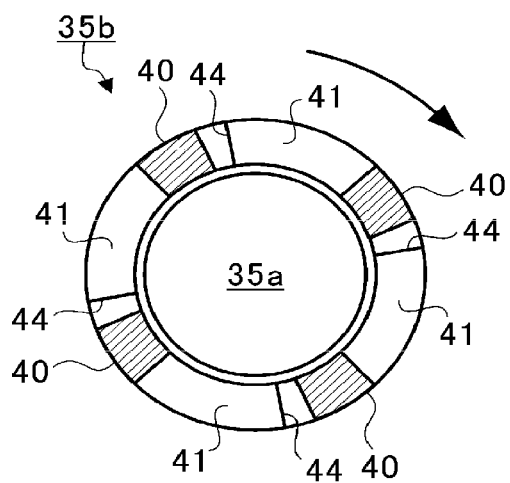
FIG. 8A is an explanatory view for illustrating a third modification example.
Figure 8B:
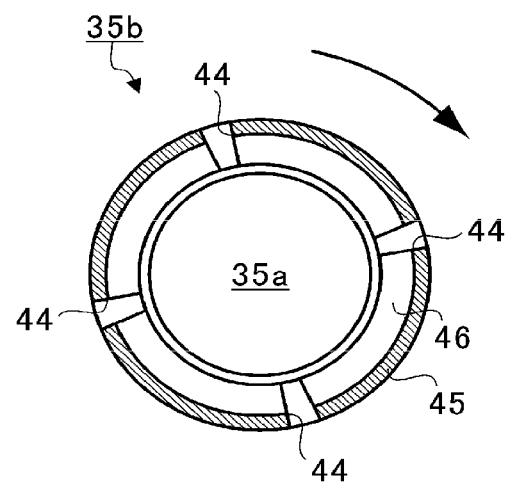
FIG. 8B is an explanatory view for illustrating a fourth modification example.

FIG. 8A is an explanatory view for illustrating a third modification example. FIG. 8B is an explanatory view for illustrating a fourth modification example. According to the third modification example and the fourth modification example, the shape of the second bearing portion 35b in plan view is different from that of the embodiment described above. Oil-holding portions 44 are formed in place of the upper oil-holding portions 42 and the lower oil-holding portions 43 in the second bearing portion 35b according to the third modification example illustrated in FIG. 8A. All of the oil-holding portions 44 are grooves formed in the tapered surfaces 41. The oil-holding portions 44 are adjacent to the pads 40 on the front side on the rotation direction of the shaft 8. On this occasion, four of the oil-holding portions 44 are arranged so as to be separated from each other at equal intervals in the rotation direction of the shaft 8.

The oil-holding portion 44 is recessed from the second bearing portion 35b toward the one end side (compressor impeller 10 side) of the shaft 8. An outer side of the oil-holding portion 44 in the radial direction of the shaft 8 is opened on an outer periphery of the second bearing portion 35b (bearing wall portion 35). In other words, the oil-holding portion 44 is opened toward the outer side in the radial direction. Moreover, an inner side of the oil-holding portion 44 in the radial direction of the shaft 8 is opened in the insertion through hole 35a. In other words, the oil-holding portion 44 is opened toward the inner side in the radial direction. Thus, the oil-holding portion 44 passes through in the radial direction in the second bearing portion 35b.

The pads 45 (indicated by hatching in the FIG. 8B) and tapered surfaces 46 are formed in the second bearing portion 35b according to the fourth modification example illustrated in FIG. 8B. Moreover, the oil-holding portions 44 according to the third modification example are formed also in the second bearing portion 35b according to the fourth modification example. The pads 45 are formed in a vicinity of an outer peripheral edge of the second bearing portion 35b. The pads 45 extend over an entire periphery of the second bearing portion 35b. The tapered surfaces 46 are formed on an inner side of the pads 45 in the radial direction. The tapered surfaces 46 are portions having a protruding height smaller than that of the pads 45. The tapered surfaces 46 extend over the entire periphery of the second bearing portion 35b. The protruding height of the tapered surface 46 continuously increases from the inner side to the outer side in the radial direction of the shaft 8. That is, an end portion of the tapered surface 46 on an inner side in the radial direction of the shaft 8 forms the largest step with respect to the pad 45. An end portion of the tapered surface 46 on an outer side in the radial direction of the shaft 8 flushes with the pad 45. The oil-holding portion 44 extends from the outer peripheral edge of the pad 45 to the inner peripheral edge of the tapered surface 46 in the radial direction. With the second bearing portions 35b according to the third modification example and the fourth modification example, the same actions and effects as those of the embodiment described above are achieved.

Figure 9:
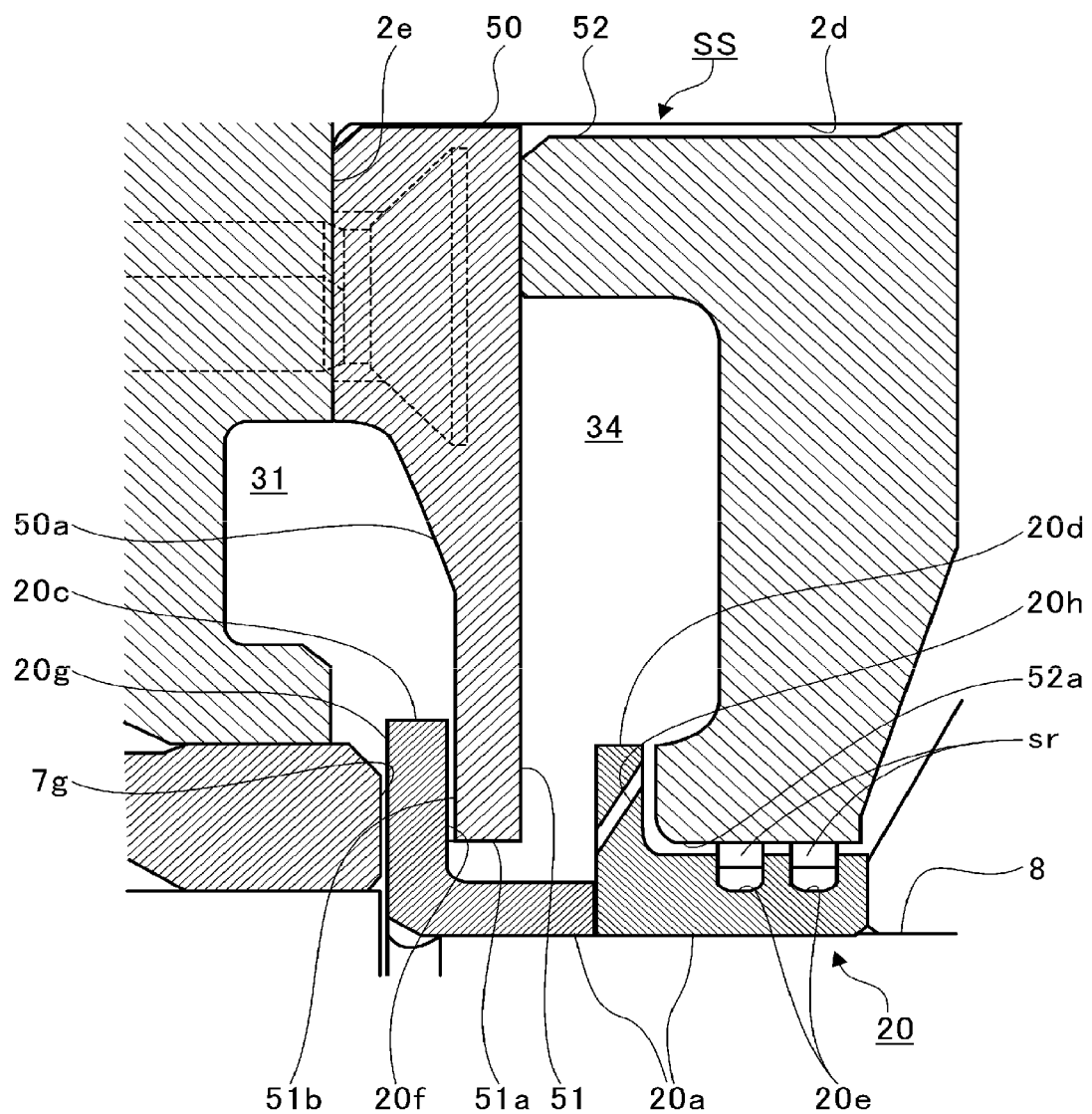
FIG. 9 is an explanatory view for illustrating a fifth modification example.

FIG. 9 is an explanatory view for illustrating a fifth modification example. According to the fifth modification example, a seal member SS is provided in place of the seal member S given in the embodiment described above. In this modification example, the same components as those of the embodiment described above are denoted by the same reference symbols, and detailed description thereof is omitted. The seal member SS includes a deflector 50. The deflector 50 has a shape similar to that of the partition wall portion 30 of the seal member S given in the embodiment described above (see FIG. 3). One flat surface of the deflector 50 is held in abutment against the abutment surface 2e. A part of the deflector 50 on an outer side in the radial direction is fixed to the abutment surface 2e by a bolt. The deflector 50 may be mounted to the opening portion 2d through other method such as press fitting or adhesive. An inclined surface 50a is formed on the flat surface of the deflector 50 opposed to the abutment surface 2e. The inclined surface 50a inclines toward the one end side (compressor impeller 10 side) of the shaft 8 from a radially outer side toward a radially inner side.

A bearing wall portion 51 is formed on a radially inner side of the deflector 50 with respect to the inclined surface 50a. An insertion through hole 51a is formed in the bearing wall portion 51. The insertion through hole 51a passes through the bearing wall portion 51 in the axial direction of the shaft 8. The shaft 8 and the rotary member 20 are inserted through the insertion through hole 51a.

According to the fifth modification example, the main body 20a of the rotary member 20 is divided into two of parts in the axial direction of the shaft 8. The main body 20a is divided into two members including a member having the flange portion 20c formed thereon and a member having the scattering portion 20d formed thereon. The bearing wall portion 51 is positioned on the one end side (compressor impeller 10 side) of the shaft 8 with respect to the flange portion 20c. The bearing wall portion 51 extends on an inner side in the radial direction of the shaft 8 with respect to the outer peripheral surface of the flange portion 20c. Thus, the bearing wall portion 51 is opposed to the flange portion 20c from the one end side (compressor impeller 10 side) of the shaft 8 in the axial direction.

According to the fifth modification example, the second opposed surface 20f is formed on the flange portion 20c of the rotary member 20. The second opposed surface 20f is the annular flat surface extending from the outer peripheral surface of the main body 20a in the radial direction. The second opposed surface 20f faces the one end side (compressor impeller 10 side) of the shaft 8.

A second bearing portion 51b is annular and is formed on the bearing wall portion 51. The second bearing portion 51b is a portion opposed to the second opposed surface 20f from the one end side (compressor impeller 10 side) of the shaft 8. The second bearing portion 51b is positioned on an outer side with respect to the insertion through hole 51a in the radial direction of the shaft 8. In other words, the insertion through hole 51a for allowing the shaft 8 to be inserted therethrough is formed in the bearing wall portion 51. The second bearing portion 51b is formed on an outer side with respect to the insertion through hole 51a in the radial direction of the shaft 8 in the bearing wall portion 51. A shape of the second bearing portion 51b in plan view is the same as that of the second bearing portion 35b (see FIG. 4). The space 31 is positioned on an outer side with respect to the second bearing portion 51b and the second opposed surface 20f in the radial direction. A clearance is defined between the second opposed surface 20f and the second bearing portion 51b in the axial direction of the shaft 8. The clearance defined between the second opposed surface 20f and the second bearing portion 51b communicates with the space 31.

The third opposed surface 20g is formed on the flange portion 20c of the rotary member 20. The third opposed surface 20g faces another end side (turbine impeller 9 side) of the shaft 8. That is, the third opposed surface 20g faces in a direction opposite to the second opposed surface 20f. The third opposed surface 20g is opposed to the third bearing portion 7g formed on the bearing member 7 in the axial direction.

Moreover, the seal member SS includes a seal plate 52. The seal plate 52 is integrally formed of the seal wall portion 32, the extension portion 33, and the bearing wall portion 35 described above. The seal plate 52 is mounted to the opening portion 2d through press fitting. The seal plate 52 may be mounted to the opening portion 2d through other methods including mounting members such as bolts or adhesive. The space 34 is defined between the bearing wall portion 51 and the seal plate 52. A center side of the seal plate 52 protrudes toward the inner side in the radial direction with respect to the outer peripheral surface of the scattering portion 20d.

A seal accommodation hole 52a is formed in the seal plate 52. The seal accommodation hole 52a passes through the seal plate 52 in the axial direction of the shaft 8. The shaft 8 and the rotary member 20 are inserted through the seal accommodation hole 52a. The two of seal grooves 20e formed in the main body 20a of the rotary member 20 are positioned in the seal accommodation hole 52a. The annular seal ring sr is provided in each of the two of seal grooves 20e.

According to the fifth modification example, the lubricant that has been introduced to the clearance between the third bearing portion 7g and the third opposed surface 20g is scattered in the space 31 by the rotation of the rotary member 20. Part of the lubricant that has been scattered in the space 31 is discharged from the lower side of the space 31 to the bottom portion side of the bearing housing 2. Moreover, part of the lubricant that has been scattered in the space 31 adheres to the deflector 50. Part of the lubricant that adheres to the deflector 50 reaches the bearing wall portion 51 by the gravity. The lubricant that has reached the bearing wall portion 51 enters the clearance between the second bearing portion 51b and the second opposed surface 20f. The lubricant forms an oil film between the second bearing portion 51b and the second opposed surface 20f. When the shaft 8 is moved to the right side in FIG. 9, the shaft 8 is supported by an oil film pressure between the second bearing portion 51b and the second opposed surface 20f. That is, the second bearing portion 51b functions as a thrust bearing that receives the thrust load from the shaft 8.

Part of the lubricant that has entered the clearance between the second bearing portion 51b and the second opposed surface 20f is discharged to a scattering portion 20d side. The lubricant that has been discharged to the scattering portion 20d side is scattered in the space 34 by the rotation of the rotary member 20. The lubricant that has been scattered in the space 34 is discharged from the lower side of the space 34 to the bottom portion side of the bearing housing 2.

According to the fifth modification example, the second bearing portion 51b is separated from the sealing rings sr more than the second bearing portion 35b given in the embodiment described above. The lubricant is supplied to the second bearing portion 51b in order to cause the second bearing portion 51b to function as the thrust bearing. The second bearing portion 51b to which the lubricant is supplied is arranged so as to be separated from the sealing ring sr, and an effect of suppressing the leakage of the lubricant to the compressor impeller side 10 is higher as compared with the embodiment described above.

Moreover, according to the fifth modification example, the through hole 20h in the first modification example is formed in the scattering portion 20d. The lubricant is sufficiently supplied to the second bearing portion 51b by the through hole 20h. Even when the lubricant supplied to the second bearing portion 51b increases, the lubricant is less liable to leak to the compressor impeller 10 side. According to the fifth modification example, the through hole 20h may not be formed. The through hole 20h may not be formed in the scattering portion 20d. According to the fifth modification example, the deflector 50 and the seal plate 52 are separated from each other in terms of a process of assembly of the rotary member 20. Thus, the embodiment has such an advantage as a reduction in the number of the components as compared with the fifth modification example.

The embodiment of the present disclosure has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

According to the embodiment and modification examples described above, the radial bearing surface 7b, the first bearing portion 7f, and the third bearing portion 7g are formed on the bearing member 7. That is, the bearing member 7 is configured to receive the radial load and the thrust load on the single member. However, a member having the first bearing portion 7f or the third bearing portion 7g formed thereon and a member having the radial bearing surface 7b formed thereon may be members independent of each other.

Moreover, in the embodiment and modification examples described above, description is made of the case in which the bearing structure A is provided in the turbocharger C. However, the application of the bearing structure A is not limited to the turbocharger C, and can be applied to various rotary machines. In a rotary machine in which the thrust load acts only in one direction, the third bearing portion 7g may not be formed.

Moreover, according to the embodiment and modification examples described above, the second opposed surface 20f and the third opposed surface 20g are formed on the rotary member 20 mounted to the shaft 8. However, any one of or both of the second opposed surface 20f and the third opposed surface 20g may be formed integrally with the shaft 8 through machining on the shaft 8.

Moreover, according to the embodiment and modification examples described above, the first opposed surface 8b is formed on the large-diameter portion 8a of the shaft 8. However, a member independent of the shaft 8 may be mounted to another end side (turbine impeller 9 side) of the shaft 8 with respect to the bearing member 7. The first opposed surface 8b may be formed on the member independent of the shaft 8.

What is claimed is:

1. A bearing structure, comprising:
   a shaft including an impeller;
   a first opposed surface, which is formed on the shaft or a member mounted to the shaft;
   a first bearing portion, which is opposed to the first opposed surface from an impeller side of the shaft;
   a second opposed surface, which is formed on the shaft or another member mounted to the shaft, and is positioned on the impeller side of the shaft with respect to the first opposed surface and the first bearing portion;
   a second bearing portion, which is opposed to the second opposed surface from the impeller side of the shaft;
   a housing including a bearing hole through which the shaft is inserted; and
   a seal member arranged between the bearing hole and the impeller,
   wherein the seal member includes:
      an insertion through hole into which the shaft is inserted;
      a bearing wall portion including the second bearing portion formed on an outer side with respect to the insertion through hole in a radial direction of the shaft; and
      an oil-holding portion that is recessed from the second bearing portion toward the impeller side of the shaft.

2. A bearing structure according to claim 1, wherein a first minimum clearance amount, which is a clearance amount between the first opposed surface and the first bearing portion when the shaft maximally moves toward the impeller side, is different from a second minimum clearance amount, which is a clearance amount between the second opposed surface and the second bearing portion when the shaft maximally moves toward the impeller side.

3. A bearing structure according to claim 1,
   wherein the oil-holding portion includes an upper oil-holding portion, which is formed above a center of the insertion through hole in the bearing wall portion, is recessed from the second bearing portion toward the impeller side of the shaft, and is opened on an outer periphery of the bearing wall portion.

4. A bearing structure according to claim 1,
   wherein the oil-holding portion includes a lower oil-holding portion, which is formed below a center of the insertion through hole in the bearing wall portion, is recessed from the second bearing portion toward the impeller side of the shaft, and is opened on an inner peripheral surface of the insertion through hole.

5. A bearing structure according to claim 1, further comprising:
   a third opposed surface, which is formed on the shaft between the first opposed surface and the second opposed surface; and
   a bearing member, which is configured to receive the shaft inserted therethrough, includes a third bearing portion formed on one end surface of the bearing member and opposed to the third opposed surface, and includes the first bearing portion formed on another end surface of the bearing member.

6. A bearing structure according to claim 5, further comprising:
a mounting hole, which is formed in the housing;
a pin hole, which is formed in the bearing member, and is opposed to the mounting hole in a radial direction of the shaft; and
a pin, which is fixed to the mounting hole, and includes a distal end side inserted into the pin hole.

7. A bearing structure according to claim 6, wherein the member mounted to the shaft is a rotary member,
which is mounted on the impeller side of the shaft with respect to the bearing member, and includes the second opposed surface; and
a through hole, which is formed in the rotary member, includes one end opened on the second opposed surface, and includes another end opened on a side away from the impeller of the shaft with respect to the second opposed surface.

8. A bearing structure according to claim 5, wherein the member mounted to the shaft is a rotary member,
which is mounted on the impeller side of the shaft with respect to the bearing member, and includes the second opposed surface; and
a through hole, which is formed in the rotary member, includes one end opened on the second opposed surface, and includes another end opened on a side away from the impeller of the shaft with respect to the second opposed surface.

9. A turbocharger comprising the bearing structure of claim 1.

* * * * *